June 11, 1957 E. B. STEELE 2,795,342
SHOVEL LOADING MECHANISM FOR SHUTTLE CARS
Filed Sept. 18, 1952 7 Sheets-Sheet 1

Inventor:
Edson B. Steele, Deceased.
Julia M. Steele, Administratrix.
by
Louis A. Maxon,
Attorney.

June 11, 1957 E. B. STEELE 2,795,342
SHOVEL LOADING MECHANISM FOR SHUTTLE CARS
Filed Sept. 18, 1952 7 Sheets-Sheet 2

Inventor:
Edson B. Steele, Deceased.
Julia M. Steele, Administratrix.
by
Amis A. Maxom
Attorney.

June 11, 1957 E. B. STEELE 2,795,342
SHOVEL LOADING MECHANISM FOR SHUTTLE CARS
Filed Sept. 18, 1952 7 Sheets-Sheet 4

Inventor:
Edson B. Steele, Deceased.
Julia M. Steele, Administratrix.
by
Anns A. Vanxom
Attorney.

June 11, 1957 E. B. STEELE 2,795,342
SHOVEL LOADING MECHANISM FOR SHUTTLE CARS
Filed Sept. 18, 1952 7 Sheets-Sheet 5

Inventor:
Edson B. Steele, Deceased.
Julia W. Steele, Administratrix.
by
Louis A. Maxom
Attorney.

June 11, 1957

E. B. STEELE

2,795,342

SHOVEL LOADING MECHANISM FOR SHUTTLE CARS

Filed Sept. 18, 1952

Inventor:
Edson B. Steele, Deceased.
Julia M. Steele, Administratrix.
by
Louis A. Maxson.
Attorney.

June 11, 1957   E. B. STEELE   2,795,342
SHOVEL LOADING MECHANISM FOR SHUTTLE CARS
Filed Sept. 18, 1952   7 Sheets-Sheet 7

Inventor:
Edson B. Steele, Deceased.
Julia M. Steele, Administratrix.
by
Amis A. Mankami
Attorney.

United States Patent Office 2,795,342
Patented June 11, 1957

2,795,342

SHOVEL LOADING MECHANISM FOR SHUTTLE CARS

Edson B. Steele, deceased, late of Rocky Grove, Pa., by Julia M. Steele, administratrix, Johnsonburg, Pa., assignor to Joy Manufacturing Company, Pittsburgh, Pa., a corporation of Pennsylvania Application September 18, 1952, Serial No. 310,152

11 Claims. (Cl. 214—78)

This invention relates to shovel loaders and, more particularly, to shovel loaders for use in loading material into transport vehicles such as shuttle cars.

Mine shuttle cars are very widely utilized vehicles for receiving loads of several tons of material and transporting the material to a desired point and there discharging it. They are, however, conventionally loaded by separate apparatus such as loading machines or continuous miners which deliver the material at a suitable height for discharge into the shuttle cars. Provided suitable means be mounted on the shuttle cars so that they may, in effect, be self-loading, their range of utility will be substantially extended. In order that such self-loading can be effected, it is highly desirable that apparatus be provided which can pick up material from a subjacent surface at various lateral points without having to move the shuttle car laterally. It is, moreover, desirable that the loading apparatus be able to make its movements relative to the material, for the purpose of collecting its load, without movement of the shuttle car. It is further desirable that the self-loading apparatus be capable of collecting material beyond an end of the car and discharging the material into the car by swinging the load over its top rather than by having to swing it through a generally horizontal arc on the order of 180° to bring the material from the point of collection to a position over the hopper in the body of the shuttle car. It is also desirable that the apparatus, which very desirably may be in the form of a shovel mechanism, be able to move the shovel from lowered position to dumping position, not only from an extreme extended position, but from any intermediate position. It is likewise desirable, since hydraulic pressure is available on shuttle cars, to provide for hydraulic pressure operated material handling.

An object of the invention is to provide an improved shoveling apparatus. Another object is to provide an improved shoveling apparatus of the hydraulically actuated type. A further object of the invention is to provide an improved shoveling apparatus which is capable of advancing a bucket, shovel or scoop bodily at least substantially rectilinearly to collect a load and which is adapted to swing the shovel whether fully extended or in some intermediate degree of extension to the same discharge position with equal facility. Another object of the invention is to provide an improved hydraulic supporting and actuating means for a shovel comprising a plurality of cylinder and piston mechanisms which cooperate with each other to effect the advancing, retracting, raising and lowering of the shovel in an improved manner. Still another object of the invention is to provide an improved supporting and actuating system for a shovel in which a plurality of parts cooperate in effecting an approximately rectilinear advance of the shovel, and thereafter certain of said parts have separative relative motion with respect to others thereof for effecting dumping movement of the shovel.

In the accompany drawings in which, for purposes of illustration, one illustrative embodiment of the invention is shown.

Figure 1:
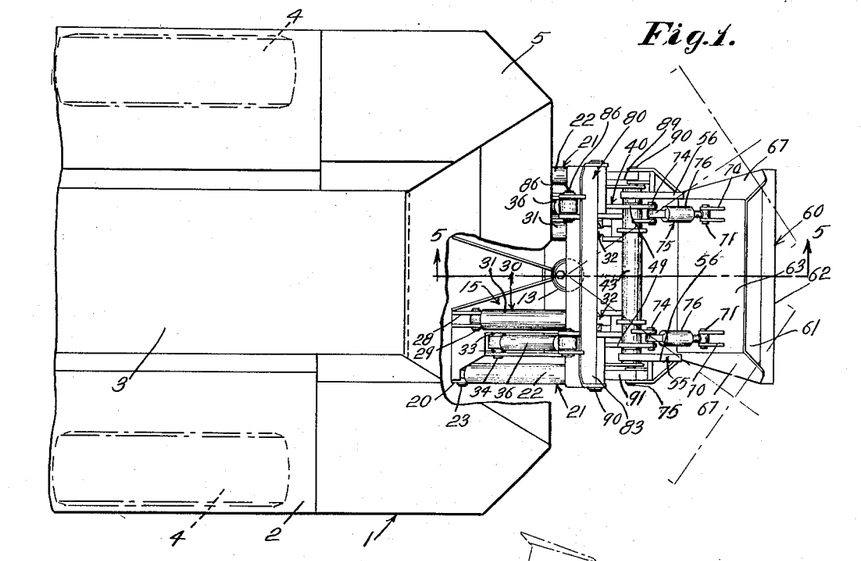
Fig. 1 is a plan view, with parts broken away, of a portion of a shuttle car on which the illustrative embodiment of my improved shovel mechanism is mounted.
Figure 2:
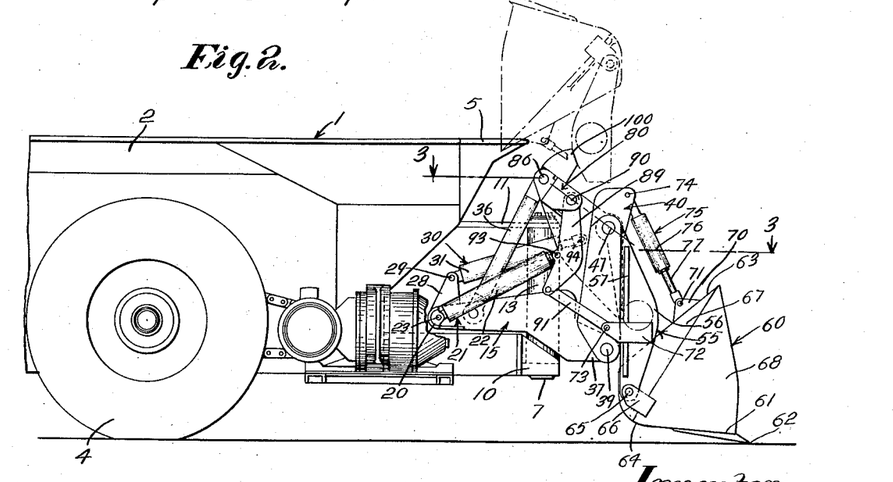
Fig. 2 is a side elevational view of the shoveling mechanism mounted on a shuttle car, with parts broken away to permit the complete illustration of the shoveling mechanism, and the shovel being shown in full in lowered, fully retracted position.

Referring now to the drawings, and first to Figs. 1 and 2, it will be noted that a portion of one end of a shuttle car is shown at 1. This shuttle car includes a body 2, through the bottom of which a conveyor 3 is adapted to be circulated under suitable control. The shuttle car is provided with wheels, two of which are shown at 4, 4. At the end of the shuttle car at which the shoveling mechanism is adapted to be disposed there is provided a special plate arrangement 5 of which the function is to insure the directing of the material discharged by the shoveling mechanism into the hopper. Midway between the sides of the shuttle car and just to the rear of the hopper portion thereof, there is supported a vertical spindle-like element 7 mounted in openings 8 and 9 respectively in a bracket 10 secured to the frame of the shuttle car and in a plate 11 which may desirably either form a part of or be connected to the material guide structure 5. Journaled for rotation about an upright axis on the spindle-like element 7 is a tubular element 13 forming a support for a base frame 15. The base frame 15 is turnable with the tubular element 13 about the upright axis of the spindle-like element 7 to permit positioning of the shovel variously transversely with respect to the end of the shuttle car, so that material may be picked up by the shovel either in line with the longitudinal center line of the car or over a certain distance at either side. In practice, there will be provided devices for turning the frame 15 to any desired position out of a central position and for returning it to central position. The shovel will be positioned for load-gathering movement in the desired relation laterally to the shuttle car body ordinarily before the load-gathering movement is initiated, and it will be returned to a position in line with the longitudinal center line of the shuttle car body at least before dumping movement is completed. The means for effecting these movements of the base frame are not illustrated in this application, and do not form a part of the invention of this application, which relates to the improved shoveling mechanism per se.

The base 15 provides:

(A) At its extreme rear and at its outermost edges pivot mountings 20 for a pair of hydraulic cylinder and piston mechanisms 21, 21, hereinafter referred to, for reasons which will later appear, as swinging arm-actuating cylinder and piston mechanisms. These are double-acting cylinder and piston mechanisms, and each includes a cylinder element 22 connected to a pivot pin 23 carried by a pivot mounting 20, and a piston rod 24 carrying a suitable piston, not shown, reciprocable within the cylinder 22 and pivotally connected to a swinging arm hereinafter described.

(B) Near its rear end and carried on upstanding mountings 28, pivot pins 29. To these another pair of cylinder and piston mechanisms 30 are connected, these cylinder and piston mechanisms being called, for reasons which will later appear, rocking frame-actuating cylinder and piston mechanisms. Each of the cylinder and piston mechanisms 30, includes a cylinder member 31 whose rear end is attached to one of the pivot pins 29, and a piston rod 32, provided with a piston (not shown) is pivotally connected as later described with a pivot in fixed relation to a rocking frame, also later described.

(C) Near its outer sides and slightly forward of both of the pivot mountings so far described, to wit: 20 and 28, a third pair of pivot mountings 33 for pivot pins 34 for the rear ends of strutlike elements or links 36. The connection of the other ends of the elements 36 will later be described, and (D) At its forward end and, as shown, in the form of lowered and forwardly extending arms 37, pivot mountings 38 carrying pivot pins 39 for the support of what is herein termed a primary frame structure 40.

The primary frame structure 40 comprises opposite side arm structures 41 pivotally supported on the pivot pins 39 carried by the lowered and forwardly extending arms 37 of the base frame 15; and these side arms, which are of composite construction as shown, are rigidly connected together as by a pair of transverse brace members, one, 42, near the pivot pins 39, and another, 43, at the free end of said primary frame structure. The brace member 43 carries a pair of arms 45, 45 which provide openings 46, 46 for receiving elongated pivot pins 47, 47. These pins also pass through coaxial openings 48, 48 in arm elements 49, 49, forming parts of the side arm structures 41, and also into still further coaxial openings 50, 50 in plates 51, 51 which are fixed by hollow mountings 52, 52 to the arm portions 49, 49.

Figure 6A:
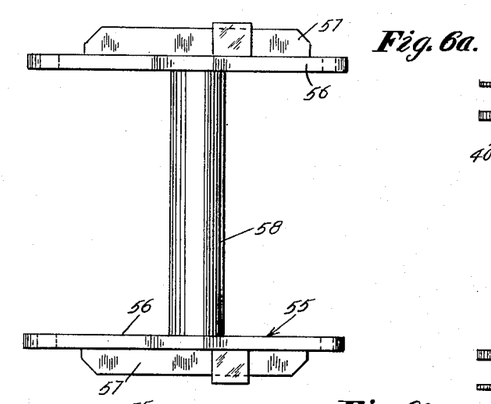
Figs. 6a and 6b are respectively plan and side views of a shovel-carrying frame to be later described.
Figures 6B, 7B, 8A, 8B, 9A, 9B:
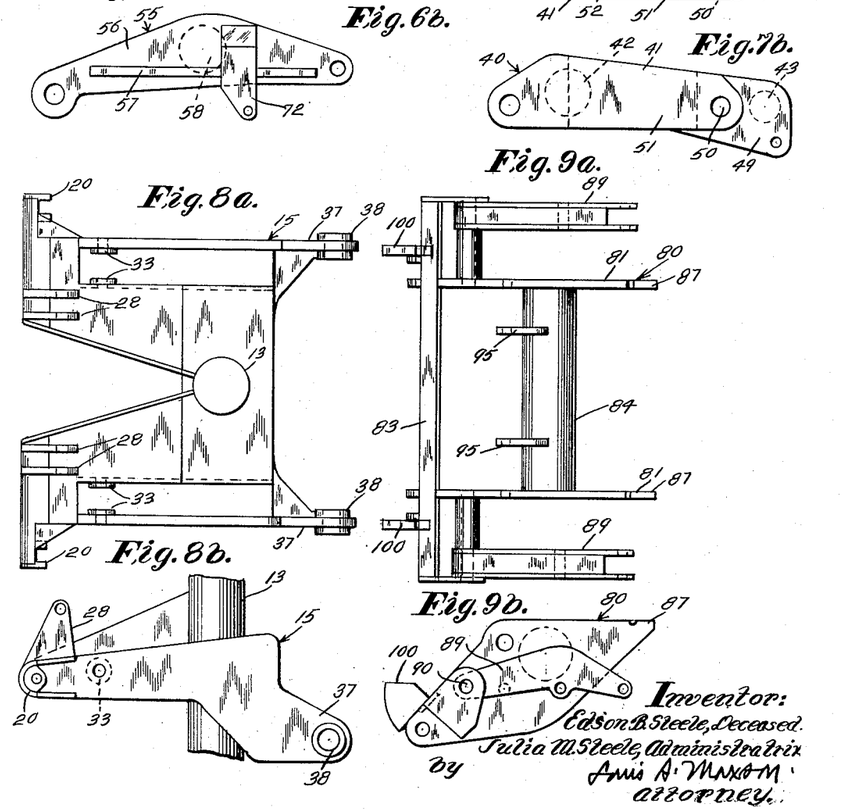
Figs. 7a and 7b are respectively plan and side views of a primary frame later to be described.
Figs. 8a and 8b are respectively plan and side views of a base frame to be later described.
Figs. 9a and 9b are respectively plan and side views of a rocking frame, and of vertical swinging arms which are pivotally connected to said rocking frame, both to be later described.
Figure 7A:
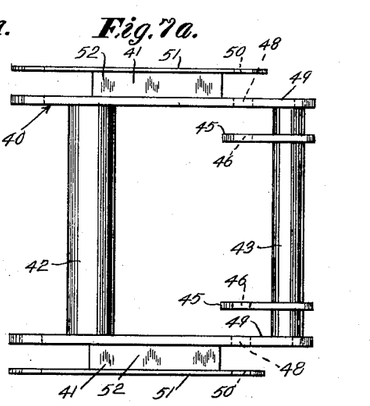

Near the outer end of the primary frame structure 40, and pivotally supported thereon, as shown, by the pins 47, 47 is a shovel-carrying frame 55 which is, as will be seen from Figs. 6a and 6b generally H-shaped, and comprises a pair of parallel side arm elements 56, 56 reenforced, as shown, by elongated plate portions 57, 57 and rigidly connected together by a heavy transverse brace 58 near their centers. At their other ends, the parallel side arm elements 56, 56 of the shovel-carrying frame pivotally support a shovel, bucket or scoop 60, the pivotal connections with the shovel being at the rear of the latter and close to its median plane.

It will be noted that the shovel consists of a generally flat portion 61 terminating in a digging edge 62 and constituting the bottom of the shovel in the digging position of the latter. It also comprises another relatively angularly disposed flat portion 63 which forms the lower side of the shovel when the latter is in dumping position. The portions 61 and 63 are connected by a curved portion 64, and it is near the mid-point of this curved portion that the pivotal connections of the shovel-carrying frame with the shovel is made by means of pivotal connections 65 on arms 66 projecting outwardly from the shovel. The shovel also has side walls, which include parallel portions 67, 67 adjacent the portion 63, and diverging portions 68, 68 which extend from the parallel portions to the portion 61, which is wider adjacent the digging edge 62 than at its back. Pivotal mountings 70 are secured to the flat portion 63 at the opposite sides of and near the free edge of the latter. These serve as mountings for pivot pins 71.

Reverting to the shovel-carrying frame, it may be observed that as shown this carries, just outwardly of the axis of the transverse brace portion 58, brackets 72 for supporting pivot pins 73. The connections of these pivot pins will shortly be described. Further pivot pins 74 are carried at the outer end of the primary frame 40.

Another pair of hydraulic cylinder and piston mechanisms 75, 75 extend between the pivot pins 71 and the pivot pins 74 which are carried at the outer end of the primary frame 40. These cylinder and piston mechanisms include, as shown, cylinders 76 pivotally connected to the pins 74; pistons, not shown, and piston rods 77 connected to the pistons and pivotally connected to the pivot pins 71.

Another frame 80, the rocking frame heretofore mentioned, comprises a pair of laterally spaced arms 81, 81 rigidly connected together by transverse members, two such transverse members being shown herein—one, 83, near the upper ends of said arms, and the second, 84, at a point near their centers but somewhat towards their other ends. The rocking frame 80 is pivotally supported on the primary frame near the upper end of the latter on the elongated pivot pins 47, heretofore described. The strutlike elements or links 36 are pivotally connected at their ends remote from their connections with the base frame to the rocking frame 80 by pins 86 supported between ears carried by the transverse member 83. The opposite ends of the arms 81 of the rocking frame have portions 87 adapted to engage the transverse crossbar 58 of the shovel-supporting frame 55. Swinging arms 89, previously mentioned but without reference characters, are pivotally supported by the rocking frame 80 on pivot pins 90, near the upper end of the latter, and these swinging arms are pivotally connected at their lower ends by links 91 to the pivot pins 73. These swinging arms between their ends support pivot pins 93 to which the outer ends of the piston rods 24 are pivotally connected.

The piston rods 32 of the cylinder and piston mechanisms 30 are pivotally connected to the rocking frame by pivot pins 94 supported on brackets 95, 95 projecting rearwardly, in terms of shovel advance, from the cross-brace member 84 of the rocking frame 80.

It will now be apparent that, in addition to the shovel proper, 60, the shovel mechanism comprises a base frame 15; a primary frame 40, swingable relative to the base frame about a forward transverse pivot provided by the pivot pins 39; a rocking frame 80 pivotally supported by the primary frame 40 near the outer end of the latter and near its own center on the pivot pin 47; a shovel supporting frame 55 pivotally supported on the primary frame 40 near the outer end of the latter on the pivot pins 47; and swinging arms 89 pivotally carried by the rocking frame 80 on the pivot pins 90; together with suitable actuating and connecting means described above.

As will later appear, when the hydraulic system is described, the swinging arms 89 are actuated by the hydraulic cylinder and piston mechanisms 21 in either of opposite directions, which hydraulic cylinder and piston mechanisms are, as previously noted, connected by the pivot pins 23 to the rear end of the base frame 15, and at their other ends by the pivot pins 93 to the swinging arms 89 between the ends of the latter. Links 91 connect the free ends of the swinging arms 89 with the pivots 73, carried by the shovel-carrying frame 55. The hydraulic cylinder and piston mechanisms 30, pivotally connected at their rear ends to the pivot pins 29 carried by the base frame 15, are pivotally connected at their other ends to the pivot pins 94 on the rocking frame 80 near the longitudinal center of the latter. The cylinder and piston mechanisms 75 are pivotally connected at their opposite ends with the shovel 60 by the pins 71 and with the outer ends of the primary frame 40 by the pins 74. All of the cylinder and piston mechanisms are double-acting and all are hydraulic, and the strokes of the cylinder and piston mechanisms 21 and 30 are, as shown, identical. Because of the connections of fixed length provided by the strutlike elements or links 36 between the base frame 15 and the upper end of the rocking frame 80, extension of the hydraulic cylinder and piston mechanisms 30, connected between the base frame 15 and the rocking frame 80, causes a bodily advance of the upper ends of the primary frame 40. Simultaneously extension of the hydraulic cylinder and piston mechanisms 21, which are pivotally connected at their opposite ends with the rear end of the base frame 15 and with the pivots 93 on the swinging arms 89, causes a swing of the shovel 60 relative to the primary frame 40 which causes the shovel to follow a substantially rectilinear path as it is advanced. The angle of the shovel to the surface from which it takes material is determined by the hydraulic cylinder and piston mechanisms 75, which connect the outer ends of the primary frame 40 with the shovel 60. With fluid trapped in the rearward ends of the cylinder and piston mechanisms 21 which are connected with the swinging arms 89; contraction of the cylinder and piston mechanisms 30, which connect the rocking frame 80 with the base frame 15, causes upward swinging of the primary frame 40, attended by swing of the shovel supporting frame 55 about its connection with the primary frame 40. As the shovel approaches approximately its highest position, shown in Fig. 13, contraction of the cylinder and piston mechanisms 75 connecting the primary frame 40 with the shovel 60—if the shovel has not previously been so moved—may cause the shovel to swing relative to the shovel supporting frame 55 to dumping position. Thereafter, upon contraction of the cylinder and piston mechanisms 21 connecting the base frame 15 and the swinging arms 89, the shovel 60 is lowered to initial position (see Fig. 2) by swinging of the shovel supporting frame 55 about the latter's pivotal mounting on the primary frame 40, it being understood that, during this action, the cylinder and piston mechanisms 30, connecting the rocker frame 80 to the base frame 15, are maintained contracted. Fig. 14 shows the mechanism in an intermediate lowering position.

Figures 3, 4, 5:
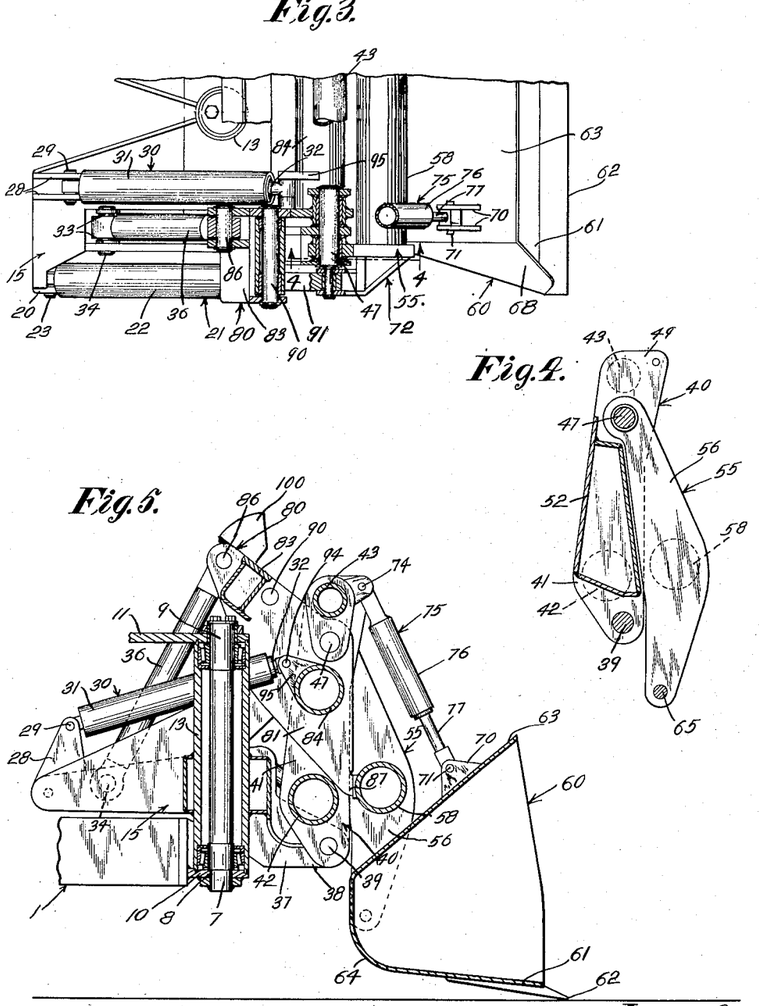
Fig. 3 is a fragmentary view on the planes of the line 3—3 of Fig. 2, on an enlarged scale.
Fig. 4 is a detail vertical section on the plane of the line 4—4 of Fig. 3.
Fig. 5 is a central vertical section through the shovel mechanism, on the plane of the line 5—5 of Fig. 1, and on an enlarged scale.

Starting with the parts in the position shown in Figs. 2 and 5, it will be noted that the extension of the cylinder and piston mechanisms 30 will apply a forward thrust to the rocking frame 80 at a point below the pivotal connection of the shovel frame 55 to the primary frame 40, which pivotal connection is on an axis in the same straight line with the axis of the pivotal connection of the rocking frame 80 to the primary frame 40. As the strutlike elements 36 restrict lowering of their pivotal connections with the rocking frame 80, the latter will undergo a movement which will be the resultant of a bodily forward movement and a rearward tilting movement, and the lowering of its pivotal mounting on the primary frame. The forward end of the rocking frame 80 engages the cross brace 58 of the shovel-carrying frame 55, and transmits a forward thrust thereto. During the advance of the shovel 60 appropriate control of the cylinder and piston mechanisms 75 may be utilized to predetermine the path of movement of the shovel edge, to maintain the shovel edge fixed against upward or downward movement, to vibrate the shovel edge to facilitate digging, and to adjust the shovel edge when modification of its generally horizontal path is desired.

During the advance or loading movement of the shovel it will be appreciated that it will be encountering a certain amount of resistance, and as fluid will be being supplied to the cylinder and piston mechanisms 21 and 30 at like pressures, it may be expected that there will be no separation between the lower forward end of the rocking frame 80 and the cross brace 58 of the shovel-carrying frame 55. At any time, however, the rate of fluid supply to the cylinder and piston mechanisms 30 is interrupted or reduced to below a cerain rate, there will occur an upswing of the shovel-carrying frame 55 about the pivot pins 47. It will be understood, of course, that, during the digging movement of the shovel, if it were desired to raise the digging edge 62, this would be possible by appropriate admission of fluid to the cylinder and piston mechanisms 75.

Attention may now be addressed to the discharging operation. A first point to note is that during this operation the contact between the shovel-carrying frame 55 and the lower end 87 of the rocking frame 80 is terminated. It may next be noted that the discharging operation may be effected in fully advanced position of the shovel, in fully retracted position of the shovel, or at any intermediate position of the shovel. In the fully advanced position of the shovel, dumping is effected by maintaining the cylinder and piston mechanisms 21 fully extended and contracting the cylinder and piston mechanisms 30. In the fully retracted position of the shovel, dumping is effected by maintaining cylinder and piston mechanisms 30 fully contracted and extending the cylinder and piston mechanisms 21. In the intermediate positions, dumping can be effected by extension of the cylinder and piston mechanisms 21 and contraction of the cylinder and piston mechanisms 30, the sequence or concurrency of these operations being subject to operator control, but dumping being, irrespective of the positions from which it starts, attended by ultimate complete extension of the cylinder and piston mechanisms 21 and contraction of the cylinder and piston mechanisms 30.

Another thing to note is that the angle of the shovel 60 to the shovel-carrying frame 55 may be altered at the commencement of the dumping movement or during the dumping movement. It should be completed before the end of the dumping movement. This angle is controllable by the cylinder and piston mechanisms 75.

Another point to observe is that it may frequently be desired, after the bucket has been forced to its forwardmost position and fully loaded, to retract it somewhat before dumping movement is initiated. This is to relieve the mechanism of the necessity of raising the bucket through an overlying portion of the pile of material.

Figure 10:
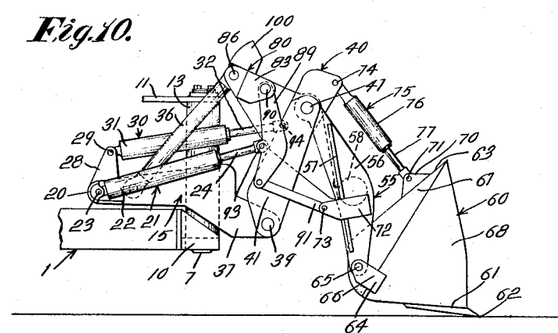
Figs. 10, 11, 12, 13 and 14 are side elevational views showing the shoveling mechanism in different positions it assumes during operation.
Figure 11:
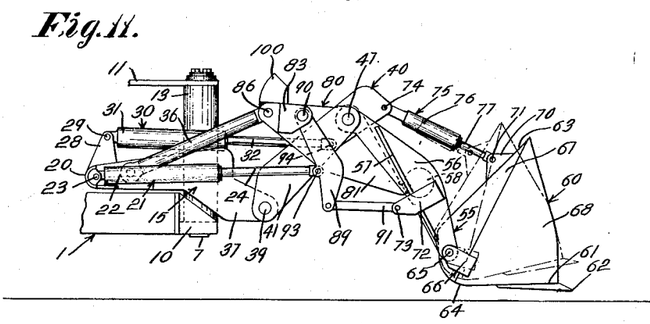
Figure 12:
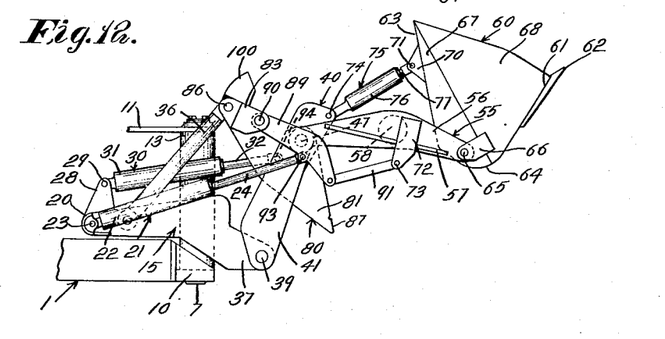
Figure 13:
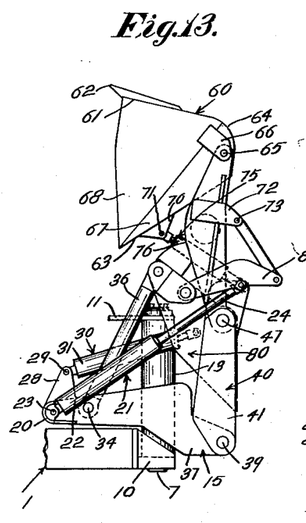
Figure 14:
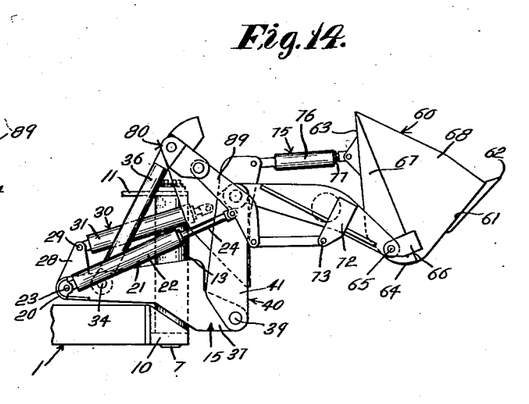

At this point, the diagrammatic views of Figs. 10 to 14 may be briefly mentioned. In Fig. 10 the shovel is shown in the course of its digging movement. Fig. 11 shows the digging movement completed. This view is worthy of note since it shows that as the shovel approaches the extreme forward end of its travel its digging edge 62 rises slightly from a strictly horizontal path unless the cylinder and piston mechanisms 75 are slightly extended, and further shows in broken lines the tilting of the bucket into appropriate angular relation for dumping, while the shovel is still in fully advanced position. Fig. 12 shows the bucket well on its way towards dumping position, and shows in full lines the contraction of the cylinder and piston mechanisms 75. Fig. 13 shows the shovel in dumping position, and Fig. 14, as previously noted, shows it partially lowered to initial position. It may be observed that there are shown on the transverse member 83 of the rocking frame 80 a pair of stops 100 engageable by the shovel-carrying frame 55 when the shovel reaches dumping position.

The hydraulic mechanism for operating and controlling the apparatus so far described may now be taken up. It will be understood that various arrangements can be provided and that one appropriate for the accomplishment of the desired operations is simply disclosed for purposes of illustration.

The hydraulic mechanism is illustrated in Figs. 15–19 inclusive, and in these figures there will immediately be observed the cylinder and piston mechanisms 21, the cylinder and piston mechanisms 30 and the cylinder and piston mechanisms 75. The various piston rods 24, 32 and 77 will also be observed.

Figure 19:
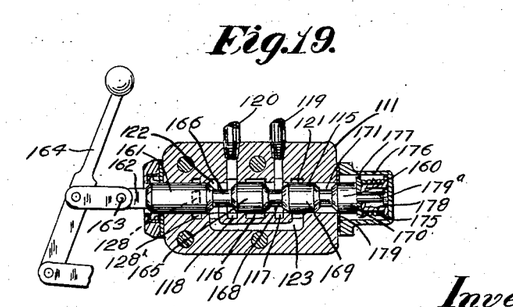
Fig. 19 is a sectional view on the plane of the line 19—19 of Fig. 15, showing a valve box, and on an enlarged scale.

To supply hydraulic fluid at appropriate pressure there is provided a pump 101, driven by a motor 102, the pump and motor being mounted in any appropriate position on the shuttle car 1. They may advantageously be mounted on a tank 103 from which the pump takes fluid through a suction connection 104. The pump discharge line is shown at 105, and leads to a valve bank generally designated 106. This includes, as illustrated, a relief valve structure 107 connected back to the tank 103, a return box structure 108, and three intermediate control valve boxes, 109, 110 and 111. A section through one of the control valve boxes is shown in Fig. 19, the section shown being through the box 111. It will be observed that a valve-receiving bore 115 is provided. This is surrounded by a series of annular grooves. There is a central groove 116, which is an exhaust groove. There are grooves 117 and 118 at opposite sides of the exhaust groove 116. The grooves 117 and 118 are connected with conduits 119 and 120 respectively. The connections of these conduits will later be described. Outside the annular grooves 117 and 118 are other annular grooves 121 and 122. These are connected together by a passage 123. These form the fluid supply connection. The passages 123 of the several valve boxes are all connected with the box section 107 to which the pump discharge conduit 105 leads. Each of the three intermediate grooves 116 is connected via the box 108 with a return conduit 125 leading back to the tank 103. The maximum pressure that can exist in each of the grooves 121 and 122 is determined by the setting of the relief valve 107. A suitable vent connection from the relief valve 107 to the box 108 and the return line 125 and tank 103 is provided in a well-known manner, via a passage 128 connecting the discharge side of the relief valve 107 and the exhaust box 108. It may be noted that the valve box 109 is provided with connections 130 and 131 leading to the cylinder and piston mechanisms 75, the valve box 110 is provided with fluid supply and exhaust connections 133 and 134 for the cylinder and piston mechanisms 30. The connection 119 previously mentioned, extends to a cross-connection 140 connected with the rod end of the cylinders 22. A cross-connection 141 between the other ends of the cylinders 22 is connected with a conduit 142. Between the conduits 120 and 142 there may, if desired, be provided parallel connections 143 and 144, the first containing a check valve 145, permitting flow from the conduit 120 to the conduit 142, but preventing reverse flow, and the other containing a relief valve 146 permitting flow from the conduit 142 to the conduit 120 when the pressure in the conduit 142 is sufficiently high. The relief valve 146 is set at a pressure which provides against excessively rapid movement of the shovel as it is swinging down from dumping position to initial position. This back pressure is much less than the discharge pressure of the pump 101, so that retraction of the shovel is not materially affected by the presence of this relief valve, past which, obviously, all of the fluid displaced during the collapsing movement of the cylinder and piston mechanisms 21 must flow. These special check valve and relief valve arrangements are not imperative, though they do relieve the operator of a certain amount of special care in control valve-manipulation, and the connections 142 and 120 may be connected directly to each other, and escape of fluid from the conduit 120 be restricted and regulated by the control valve box 111. The conduits 130 and 131 lead to cross-connections 150 and 151 between cylinders 76 at the opposite ends of the latter. The conduits 133 and 134 lead to cross-connections 153 and 154 between the ends of the cylinders 31.

The several valve boxes have in their respective bores valve elements 160. These valve elements are of like construction and they include an extended cylindrical portion 161 from which a projection 162, having a pivotal connection at 163 with an operating lever 164 extends. Between the cylindrical portion 161 and the adjacent one, 165, of two spaced cylindrical heads is a groove 166. This groove, in the position of the valve shown in Fig. 19, connects the supply groove 122 with the conduit 120 through the groove 118. Also, in this position of the valve, another groove—a central groove 168—which is disposed between the head 165 and another and corresponding head 169, connects the exhaust groove 116 with a conduit 119 through the annular groove 117. In the central position of the valve element, the groove 168 is opposite the annular groove 116 and the heads 165 and 169 are opposite the grooves 118 and 117 and fluid is not supplied to either of the conduits 119 or 120 or permitted to flow back through either of the same. As a matter of fact, the groove 166 at such time connects the supply groove 122 with the passage 128 which includes, in each valve box, a groove 123' surrounding the valve-receiving bore 115, and so the pump discharge is connected back to the tank and the pump discharge line is under no substantial pressure. Fluid is trapped in the cylinder and piston mechanisms 21 in the central position of the valve element 160. The valve element 160 has one further head or cylindrical portion 170, separated by a groove 171 from the intermediate head 169. The groove 171 is designed to connect the conduit 119 through the annular groove 117 with the supply groove 121 with the valve element 160 in the extreme opposite position from that shown in Fig. 19.

A spring 175, housed in an enclosure 176, is provided to return the valve element 160 to middle position from either position, when release of the control handle for the valve permits this to be done. It does not move the valve past mid-position, because of the provision of the disc 177 and thimble 178, which respectively engage shoulders 179 and 179ᵃ when the valve element 160 gets to mid-position. The construction is conventional and needs no further description. The several operating elements or handles for the valves 160 are, in the case of the valve boxes 109, 110 and 111, respectively designated 164ᵃ, 164ᵇ and 164ᶜ. These are so closely arranged to each other that an operator can operate two of them with one hand and a third with the other hand.

Very little more needs to be said about the hydraulic control mechanism. The handle 164ᵃ controls the cylinder and piston mechanisms 75; handle 164ᵇ controls the cylinder and piston mechanisms 30 and handle 164ᶜ controls the cylinder and piston mechanisms 21. The valve elements and control valve boxes are the same in each case.

Figure 15:
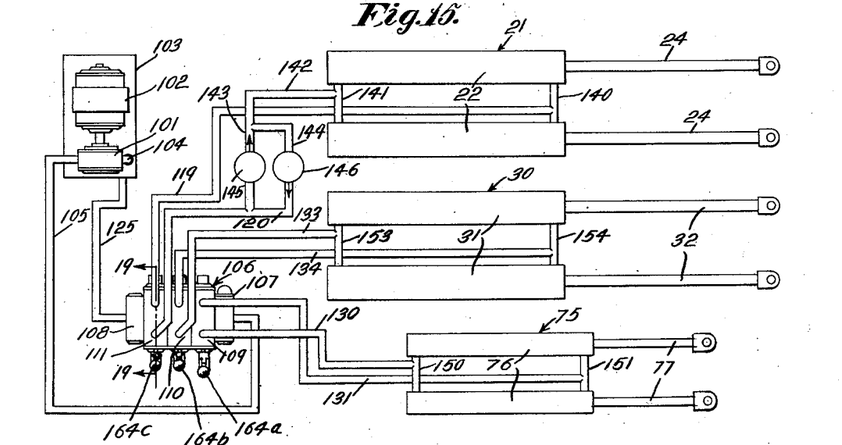
Figs. 15, 16, 17 and 18 are diagrammatic views of the hydraulic system, showing respectively, in Fig. 15, the so-called sump or shovel-loading operation, in Fig. 16 the retracting operation, in Fig. 17 the discharge operation, and in Fig. 18 the lowering operation returning the bucket to initial position.

The position of the parts shown in Fig. 15 corresponds to that with the shovel 60 in fully extended position, and the bucket at the angle appropriate to loading of material from a horizontal surface on which the shuttle car stands. Ordinarily fluid will be locked in the opposite ends of the cylinders 76 during digging, but, if desired, during sumping or digging, short, rapid in and out movements of the handle 164ᵃ may be used to cause retraction of the bucket edge 62, and facilitate material penetration, and the handle 164ᵃ may be manipulated to effect change in the position of the shovel edge as it advances and it can, of course, change the height of the whole shovel path relative to the bottom. The position of Fig. 15 represents the completion of sumping, with the valves still in the position they occupy to effect sumping. That is, the handles 164ᵇ and 164ᶜ are in advanced position, effecting the delivery of fluid under pressure from the grooves 122 to the conduits 120 and 133, and the handle 164ᵃ is in mid-position.

Figure 16:
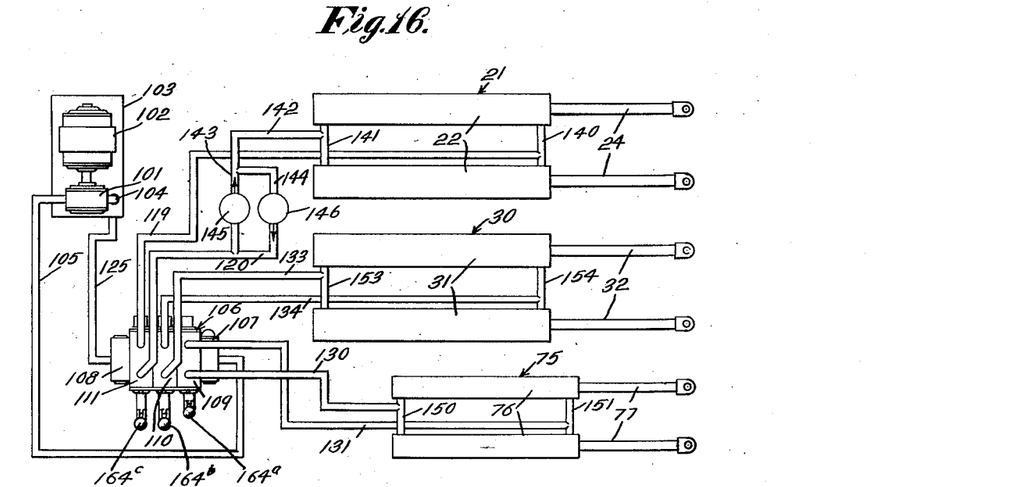

In Fig. 16 the position during substantially rectilinear retraction of the shovel is shown. In case it is desired that fluid be supplied to the cylinders 22 and 31 at the rod ends thereof simultaneously and accordingly, with the connections described, the handles 164ᵇ and 164ᶜ will be pulled out to effect fluid supply from the annular grooves 121 to the conduits 119 and 134. The handle 164ᵃ remains in central position at this time. During retraction, it would of course, be possible to manipulate lever 164ᵃ to tilt the forward edge 62 of the shovel 60 slightly upwardly.

Figure 17:
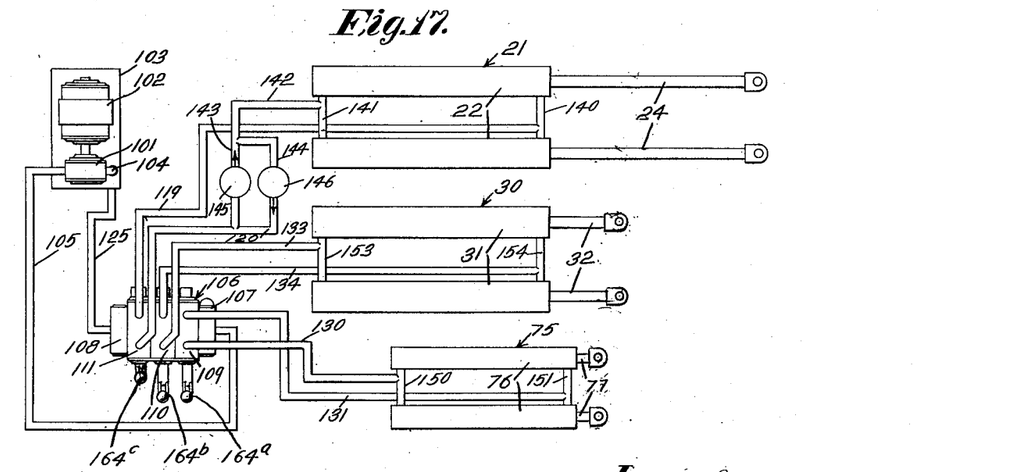
Figure 18:
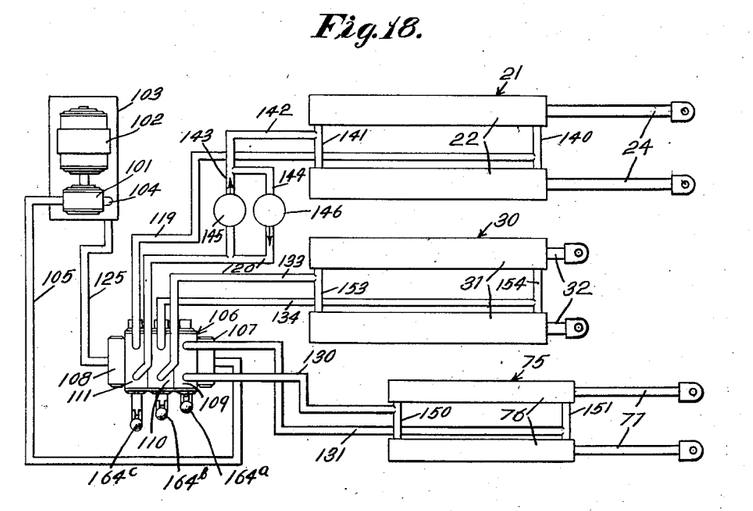

In Fig. 17 the discharge or dumping operation is being shown. In this view it will be noted that the handles 164ᵃ and 164ᵇ are out, while the handle 164ᶜ is shown in. Actually, the handle 164ᶜ might quite as well be in neutral position, causing trapping of fluid in the cylinders 22 with the piston rods 24 of these cylinders in fully extended position. Indeed, it would automatically return to neutral position unless held in the one shown. Fluid is being supplied under control of the handle 164ᵃ to tilt the bucket up to discharge position, and, under the control of the handle 164ᵇ, to effect retraction of the cylinder and piston mechanisms 31 to cause the bucket to pass through the sequence of positions shown in Figs. 11, 12 and 13. In Fig. 18 the operation of lowering the bucket is shown. This is accomplished by collapsing the cylinder and piston mechanisms 21. To accomplish this, the handle 164ᶜ is pulled out to cause fluid to be supplied to the passage 119, and so to the rod ends of the cylinders 22, causing the cylinder and piston mechanisms 21 to collapse and the bucket to lower. The cylinder and piston mechanisms 31 are already collapsed and the handle 164ᵇ may be in midposition. At the conclusion of lowering, or during it if desired, the handle 164ᵃ can be moved to effect supply of fluid through the conduit 130 to effect return of the shovel 60 to digging position.

In view of the extensive description already given there is no apparent need for further either general or specific description of the operation. It may simply be noted that the invention described is well adapted for the effective performance of the objects pointed out.

While there is in this application specifically described one form which the invention may assume in practice, it will be understood that this form of the same is shown for purposes of illustration and that the invention may be modified and embodied in various other forms without departing from its spirit or the scope of the appended claims.

What is claimed is:

1. In combination, a base frame having a pivotal support at its forward end, a primary frame mounted on said pivotal support for swinging in upright planes relative to the base frame, a rocking frame pivotally supported on an axis between and substantially spaced from both of its ends on said primary frame at a point near the swingable end of the latter, a shovel, a shovel-carrying frame pivotally connected at its upper end to said primary frame and pivotally connected at its opposite end to said shovel, strutlike connections between the base frame and the end of the rocking frame more remote from the shovel when the latter is in digging position, cylinder and piston mechanism acting on the rocking frame for causing swinging movement of the latter about its pivotal connection with said strutlike elements, swinging arms pivotally connected with said rocking frame, links connecting the free ends of said swinging arms with the shovel-carrying frame nearer the end of the latter remote from its pivotal connection with the primary frame, cylinder and piston mechanism pivotally connected with the base frame and said swinging arms, and cylinder and piston mechanism pivotally connected with the outer ends of the primary frame and the upper side of the shovel as the latter is viewed in digging position, the end of the rocking frame remote from the connections with the strutlike elements adapted to abut and transmit a forward thrust to and having only a one-way abutting coaction with the shovel-carrying frame.

2. In combination, a base frame having a pivotal support at its forward end, a primary frame mounted on said pivotal support for swinging in upright planes relative to the base frame, a rocking frame pivotally supported on an axis between and substantially spaced from both of its ends on said primary frame at a point near the swingable end of the latter, a shovel, a shovel-carrying frame pivotally connected at its upper end to said primary frame and pivotally connected at its opposite end to said shovel, the pivot connection between the rocking frame and the primary frame and the pivot connection between the shovel-carrying frame and the primary frame being on alined axes, strutlike elements between the base frame and the end of the rocking frame more remote from the shovel when the latter is in digging position, cylinder and piston mechanism acting on the rocking frame for causing swinging movement of the latter about its pivotal connection with said strutlike elements, swinging arms pivotally connected with said rocking frame, links connecting the free ends of said swinging arms with the shovel-carrying frame nearer the end of the latter remote from its pivotal connection with the primary frame, cylinder and piston mechanism pivotally connected with the base frame and said swinging arms, and cylinder and piston mechanism pivotally connected with the outer ends of the primary frame and the upper side of the shovel as the latter is viewed in digging position, the end of the rocking frame remote from the connections with the strutlike elements adapted to abut and transmit a forward thrust to and having only a one-way abutting coaction with the shovel-carrying frame.

3. In combination, a base frame having a pivotal support at its forward end, a primary frame mounted on said pivotal support for swinging in upright planes relative to the base frame, a rocking frame pivotally supported on an axis between and substantially spaced from both of its ends on said primary frame at a point near the swingable end of the latter, a shovel, a shovel-carrying frame pivotally connected at its upper end to said primary frame and pivotally connected at its opposite end to said shovel, strutlike elements extending between the base frame and the end of the rocking frame more remote from the shovel when the latter is in digging position, cylinder and piston mechanism acting on the rocking frame for causing swinging movement of the latter about its pivotal connection with said strutlike elements, swinging arms pivotally connected with said rocking frame at a point in the latter forward of the connection of said rocking frame with said strutlike elements, links connecting the free ends of said swinging arms with the shovel-carrying frame nearer the end of the latter remote from its pivotal connection with the primary frame, cylinder and piston mechanism pivotally connected with the base frame and said swinging arms, and cylinder and piston mechanism pivotally connected with the outer ends of the primary frame and the upper side of the shovel as the latter is viewed in digging position, the end of the rocking frame remote from the connections with the strutlike elements adapted to abut and transmit a forward thrust to and having only a one-way abutting coaction with the shovel-carrying frame.

4. In combination, a base frame having a pivotal support at its forward end, a primary frame mounted on said pivotal support for swinging in upright planes relative to the base frame, a rocking frame pivotally supported between its ends on said primary frame at a point near the swingable end of the latter, a shovel, a shovel-carrying frame pivotally connected at its upper end to said primary frame and pivotally connected at its opposite end to said shovel, the pivot connection between the rocking frame and the primary frame and the pivot connection between the shovel-carrying frame and the primary frame being on alined axes, strutlike elements extending between the base frame and the end of the rocking frame more remote from the shovel when the latter is in digging position, cylinder and piston mechanism acting on the rocking frame for causing swinging movement of the latter about its pivotal connection with said strutlike elements, swinging arms pivotally connected with said rocking frame at a point in the latter forward of the connection of said rocking frame with said strutlike elements, links connecting the free ends of said swinging arms with the shovel-carrying frame nearer the end of the latter remote from its pivotal connection with the primary frame, cylinder and piston mechanism pivotally connected with the base frame and said swinging arms, and cylinder and piston mechanism pivotally connected with the outer ends of the primary frame and the upper side of the shovel as the latter is viewed in digging position, the end of the rocking frame remote from the connections with the strutlike elements adapted to abut and having only an abutting connection with the shovel-carrying frame.

5. In combination, in a shoveling apparatus, a shovel, a shovel-carrying frame connected with said shovel at the rear of the latter, a primary frame, a base frame on which said primary frame is pivotally supported at its lower end, said shovel-carrying frame pivotally connected to said primary frame near the upper end of the latter, extensible link means pivotally connected to the upper end of said primary frame and to the top of the shovel as the latter is viewed in digging position, a rocking frame pivotally supported on said primary frame on an axis alined with the axis of pivotal connection of said shovel-carrying frame with said primary frame, strutlike elements pivotally connected to said base frame and to said rocking frame, swinging arms pivotally connected with said rocking frame and having pivotal link connections with said shovel-carrying frame, means for swinging said rocking frame forwardly about its pivotal connection with said strutlike elements, and means for swinging said swinging arms about their connections with said rocking frame.

6. In combination, in a shoveling apparatus, a shovel, a shovel-carrying frame connected with said shovel at the rear of the latter, a primary frame, a base frame on which said primary frame is pivotally supported at its lower end, said shovel-carrying frame pivotally connected to said primary frame near the upper end of the latter, link means pivotally connected to the upper end of said primary frame and to the top of the shovel as the latter is viewed in digging position, a rocking frame pivotally supported on said primary frame, strutlike elements pivotally connected to said base frame and to said rocking frame, swinging arms pivotally connected with said rocking frame and having pivotal link connections with said shovel-carrying frame, means for swinging said rocking frame forwardly about its pivotal connection with said strutlike elements, and means for swinging said swinging arms about their connections with said rocking frame, said rocking frame having at its lower end portions abutting said shovel-carrying frame and thrusting the latter forward during digging movement of said shovel.

7. In combination, in a shoveling apparatus, a shovel, a shovel-carrying frame connected with said shovel at the rear of the latter, a primary frame, a base frame on which said primary frame is pivotally supported at its lower end, said shovel-carrying frame pivotally connected to said primary frame near the upper end of the latter, extensible link means pivotally connected to the upper end of said primary frame and to the top of the shovel as the latter is viewed in digging position, a rocking frame pivotally supported on said primary frame on an axis alined with the axis of pivotal connection of said shovel-carrying frame with said primary frame, strutlike elements pivotally connected to said base frame and to said rocking frame, swinging arms pivotally connected with said rocking frame and having pivotal link connections with said shovel-carrying frame, means for swinging said rocking frame forwardly about its pivotal connection with said strutlike elements, and means for swinging said swinging arms about their connections with said rocking frame, said rocking frame having at its lower end portions abutting said shovel-carrying frame and thrusting the latter forward during digging movement of said shovel.

8. In combination, in a shoveling apparatus, a shovel, a shovel-carrying frame connected with said shovel at the rear of the latter, a primary frame, a base frame on which said primary frame is pivotally supported at its lower end, said shovel-carrying frame pivotally connected to said primary frame near the upper end of the latter, extensible link means pivotally connected to the upper end of said primary frame and to the top of the shovel as the latter is viewed in digging position, a rocking frame pivotally supported on said primary frame on an axis alined with the axis of pivotal connection of said shovel-carrying frame with said primary frame, strutlike elements pivotally connected to said base frame and to said rocking frame, swinging arms pivotally connected with said rocking frame and having pivotal link connections with said shovel-carrying frame, means for swinging said rocking frame forwardly about its pivotal connection with said strutlike elements, and means for swinging said swinging arms about their connections with said rocking frame, said rocking frame having at its upper ends abutments engageable by said shovel-carrying frame when the latter is in shovel-dumping position.

9. In combination, in a shoveling apparatus, a shovel, a shovel-carrying frame connected with said shovel at the rear of the latter, a primary frame, a base frame on which said primary frame is pivotally supported at its lower end, said shovel-carrying frame pivotally connected to said primary frame near the upper end of the latter, link means pivotally connected to the upper end of said primary frame and to the top of the shovel as the latter is viewed in digging position, a rocking frame pivotally supported on said primary frame, strutlike elements pivotally connected to said base frame and to said rocking frame, swinging arms pivotally connected with said rocking frame and having pivotal link connections with said shovel-carrying frame, means for swinging said rocking frame forwardly about its pivotal connection with said strutlike elements, and means for swinging said swinging arms about their connections with said rocking frame, said rocking frame having at its opposite ends abutments engageable by said shovel-carrying arms respectively in the digging and in the dumping position of the latter.

10. In combination, in a shoveling apparatus, a shovel, a shovel-carrying frame connected with said shovel at the rear of the latter, a primary frame, a base frame on which said primary frame is pivotally supported at its lower end, said shovel-carrying frame pivotally connected to said primary frame near the upper end of the latter, extensible link means pivotally connected to the upper end of said primary frame and to the top of the shovel as the latter is viewed in digging position, a rocking frame pivotally supported on said primary frame on an axis alined with the axis of pivotal connection of said shovel-carrying frame with said primary frame, strutlike elements pivotally connected to said base frame and to said rocking frame, swinging arms pivotally connected with said rocking frame and having pivotal link connections with said shovel-carrying frame, means for swinging said rocking frame forwardly about its pivotal connection with said strutlike elements, and means for swinging said swinging arms about their connections with said rocking frame, said rocking frame having at its opposite ends abutments engageable by said shovel-carrying arms respectively in the digging and in the dumping position of the latter.

11. In combination, in a shoveling mechanism, a base frame, a shovel, supporting and moving means for said shovel including pivotally connected frames movable to substantially alined, substantially vertical positions to bring said shovel to dumping position, the then upper frame then swingable about its pivotal connection with the other downwardly to lower the shovel to a position for the commencement of digging, means for effecting movement of said frames to said substantially alined positions and effecting lowering of the shovel including a hydraulic cylinder and piston mechanism in extended position in the dumping position of the shovel and collapsing as the shovel is lowered, and fluid supply means for said cylinder and piston mechanism having free flow thereto and impeded flow therefrom, and having fluid supply and venting means including parallel connections one provided with a check valve and the other with a relief valve set at a predetermined pressure, said check and relief valves each precluding flow through them in one direction, and having their directions of precluded flow mutually opposite.

References Cited in the file of this patent

UNITED STATES PATENTS

| | | |
|---|---|---|
| D. 162,873 | Pilch | Apr. 10, 1951 |
| 1,371,344 | Brackett | Mar. 15, 1921 |
| 1,561,694 | Clutter | Nov. 17, 1925 |
| 1,590,662 | Zygalinski | June 29, 1926 |
| 2,427,968 | Hoover | Sept. 23, 1947 |
| 2,449,212 | Fraga | Sept. 14, 1948 |
| 2,455,474 | Drott et al. | Dec. 7, 1948 |
| 2,560,674 | Westall | July 17, 1951 |
| 2,603,374 | McNamara | July 15, 1952 |
| 2,674,500 | Hukari | Apr. 6, 1954 |